United States Patent
Chen et al.

(10) Patent No.: US 7,576,984 B2
(45) Date of Patent: Aug. 18, 2009

(54) MOUNTING APPARATUS FOR DATA STORAGE DEVICE

(75) Inventors: Yun-Lung Chen, Tu-Cheng (TW); Wu Long, Shenzhen (CN); Fa-Ming Jiang, Shenzhen (CN); Gang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 466 days.

(21) Appl. No.: 11/153,561

(22) Filed: Jun. 14, 2005

(65) Prior Publication Data

US 2006/0120170 A1 Jun. 8, 2006

(30) Foreign Application Priority Data

Dec. 8, 2004 (CN) .................. 2004 2 0102682 U

(51) Int. Cl.
 *G06F 1/16* (2006.01)
(52) U.S. Cl. ........................................ 361/685; 248/694
(58) Field of Classification Search ................ 248/694, 248/684, 500, 544; 361/685, 683, 684, 724, 361/725, 726, 727
See application file for complete search history.

(56) References Cited

U.S. PATENT DOCUMENTS 5,349,483 A 9/1994 Tsai .................. 360/97.01
6,356,441 B1 * 3/2002 Claprood .................. 361/685
6,359,778 B1 * 3/2002 Wu .......................... 361/685
6,373,695 B1 * 4/2002 Cheng ...................... 361/685
6,377,447 B1 * 4/2002 Boe ......................... 361/685
6,480,391 B1 * 11/2002 Monson et al. ............ 361/752
6,671,180 B2 * 12/2003 Le et al. ................... 361/726
6,754,071 B2 * 6/2004 Lin et al. .................. 361/685
7,259,960 B2 * 8/2007 Hua et al. ................. 361/685
7,295,432 B2 * 11/2007 Xu ........................... 361/685
2004/0022033 A1 * 2/2004 Hsu ......................... 361/726
2005/0068721 A1 * 3/2005 Chen et al. ................ 361/685
2005/0190535 A1 * 9/2005 Peng et al. ................ 361/685

FOREIGN PATENT DOCUMENTS

TW 398362 5/2000

* cited by examiner

*Primary Examiner*—Ramon O Ramirez

(57) ABSTRACT

A mounting apparatus for a data storage device includes a chassis (10), a data storage device (50) with a groove (522) defined in a sidewall (52) thereof, a supporting bracket (20) fixed to the chassis (10), the supporting bracket (20) having a sidewall (22) defining a through hole (221) and a recess (228) therein and a positioning member (30) adapted to be pivotably mounted to the supporting bracket (20). The positioning member (30) has a protrusion (361) engaging in the recess (228) for locating the positioning member (30) and a locating pin (341) extending through the through hole (221) of the supporting bracket (20) to engage in the groove (522) of the data storage device (50) for securing the data storage device (50) on the chassis (10).

19 Claims, 4 Drawing Sheets

MOUNTING APPARATUS FOR DATA STORAGE DEVICE

BACKGROUND OF THE INVENTION

1. Field of the Invention

The present invention relates to a mounting apparatus, and more particularly to a mounting apparatus that demounts or mounts a data storage device conveniently.

2. Background of the Invention

With the advancement of science and technology, our modem society is closely linked to computer. Various data storage devices are installed in a computer enclosure for communication and dealing with data. Such a device may be, for instance, a hard disk drive, a CD-ROM/DVD-ROM drive, a CD-RW/DVD-RW drive or other similar device. Nowadays, a computer enclosure is tightly packed in order to keep the size of the system small to fit on or under a desk. A conventional data storage device is directly attached to a computer enclosure with screws. However, the screws are usually very small, therefore making it difficult for a computer user to hold the screws in position while screwing them in with a screwdriver. The screws are inserted into holes which are on the data storage device assembly and on the chassis to which the data storage device assembly is being attached. The holes are difficult to align because they are also typically very small. Also, if the tolerances are incorrect due to manufacturing defects, the holes may not line up exactly, making it difficult to insert the screws. Obviously, using screws to attach the data storage device to a computer enclosure may be arduous due to requiring insertion of the screws. Both insertion and removal of the screws are time consuming and cumbersome owing to the work space restrictions and difficult accessibility.

In addition, during the course of the operation of the data storage device, it may cause the data storage device to vibrate, therefore to make the screws come loose. As a result, one danger of damaging the data storage device comes into being. Understandably, some attempts have been taken to introduce a mounting apparatus for a data storage device without screws.

What is needed, therefore, is a mounting apparatus for a data storage device facilitating assembly and disassembly in a chassis.

SUMMARY

A mounting apparatus for a data storage device in accordance with a preferred embodiment of the present invention includes a chassis, a data storage device with a groove defined in a sidewall thereof, a supporting bracket fixed to the chassis and a positioning member adapted to be pivotably mounted to the supporting bracket. The supporting bracket has a sidewall defining a through hole and a recess therein. The positioning member has a protrusion abutting against the recess for locating the positioning member and a locating pin extending through the through hole to engage in the groove for securing the data storage device on the chassis.

Other advantages and novel features of the present invention will be drawn from the following detailed description of preferred embodiment of the present invention with the attached drawings, in which:

DETAILED DESCRIPTION OF THE INVENTION

Figure 1:
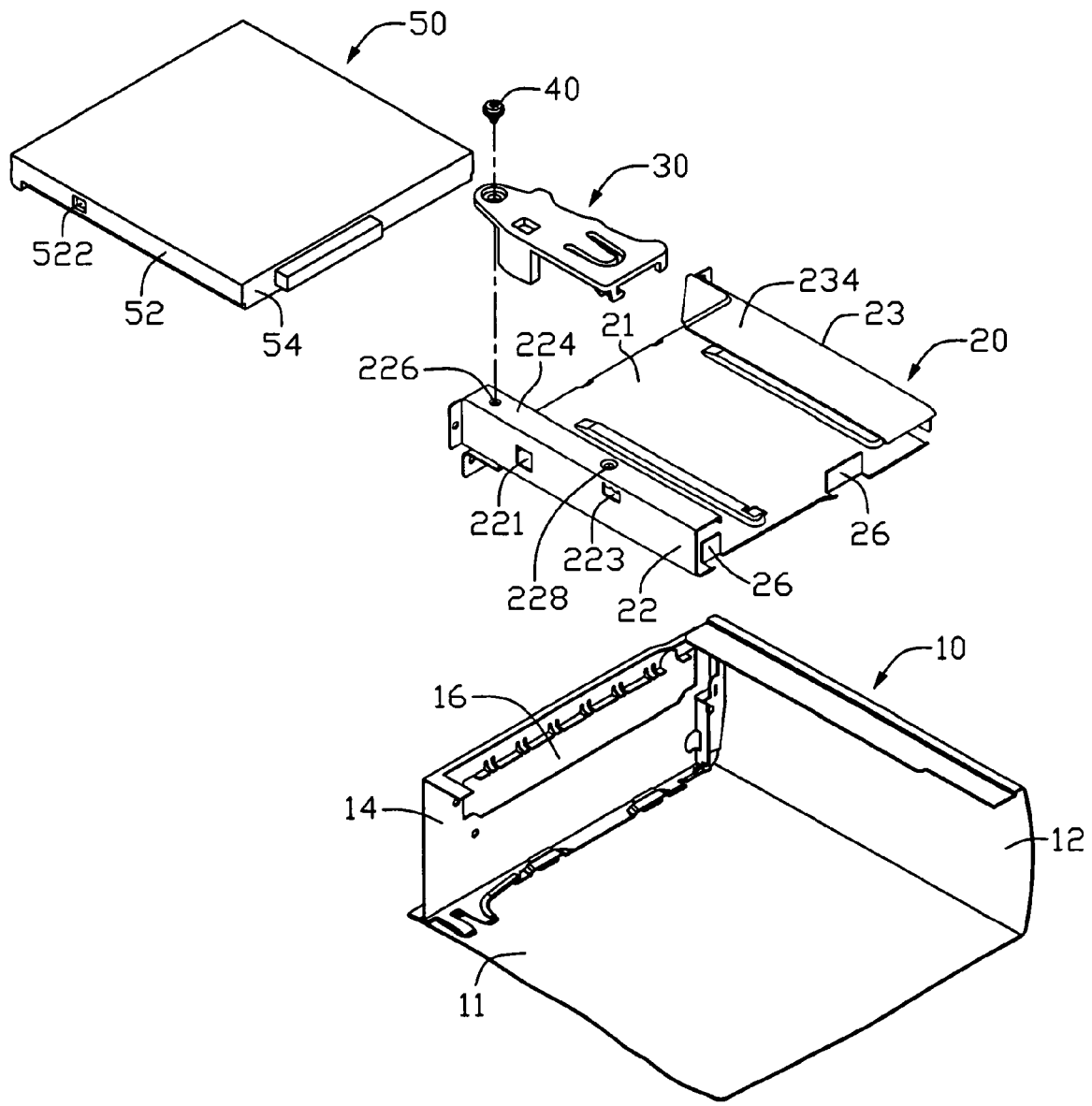
FIG. 1 is an exploded, isometric view of a mounting apparatus for a data storage device in accordance with a preferred embodiment of the present invention including a fastener, a positioning member, a supporting bracket and a chassis.

Referring to FIG. 1, a mounting apparatus for a data storage device in accordance with a preferred embodiment of the present invention includes a chassis 10, a supporting bracket 20, a positioning member 30 and a fastener 40 (for example, screw).

The chassis 10 includes a bottom panel 11, a side panel 12 and a front panel 14. An elongated opening 16 is defined in the front panel 14 thereof.

The supporting bracket 20 is securely fixed to the front panel 14 of the chassis 10. The supporting bracket 20 includes a bottom wall 21 and two sidewalls 22, 23 extending vertically and upwardly from the bottom wall 21. A through hole 221 and a through slot 223 are defined in the sidewall 22 of the supporting bracket 20. The two sidewalls 22, 23 are both bent inwardly and vertically to form two flanges 224, 234. A screw hole 226 and a recess 228 are defined in the flange 224 thereof. Two stopping tabs 26 extend from the rear end of the bottom wall 21 of the supporting bracket 20.

The data storage device 50 may be a CD-ROM drive or other devices, such as a hard disk drive, a DVD-ROM drive, a CD-RW drive, a DVD-RW drive and so on. The data storage device 50 includes a sidewall 52 and a rearwall 54. A groove 522 is defined in the sidewall 52 thereof.

Figure 2:
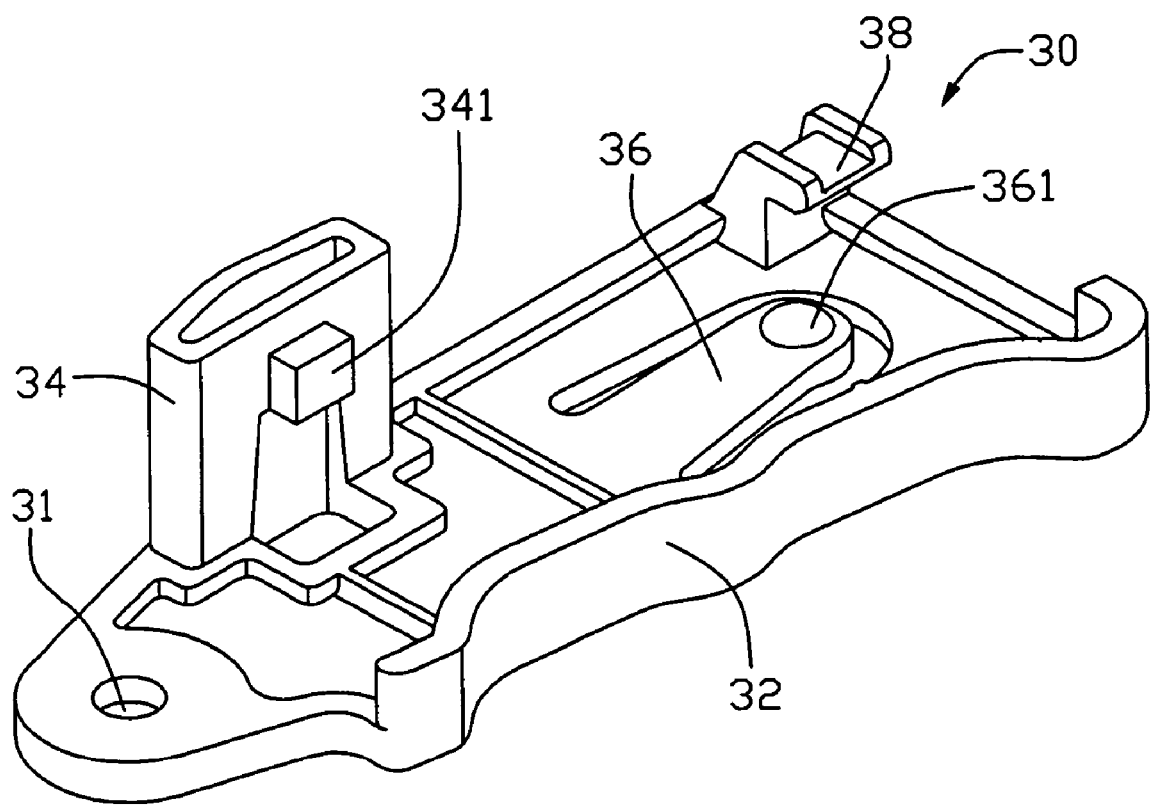
FIG. 2 is an enlarged, isometric view of the positioning member of FIG. 1, but viewed from another aspect.

Referring to FIG. 2, the positioning member 30 is pivotably mounted to the supporting bracket 20. A through hole 31 is defined at the front end thereof. A handle 32 is formed along an edge of the positioning member 30. A supporting portion 34 is formed on an opposite edge thereof. A locating pin 341 extends vertically and inwardly from the supporting portion 34 thereof, and the locating pin 341 may be other shape. An elastic tab 36 is formed in the middle of the positioning member 30. A protrusion 361 is formed on a lower surface of the elastic tab 36. An L-shaped resisting block 38 extends inwardly at a corner of the positioning member 30.

Figure 3:
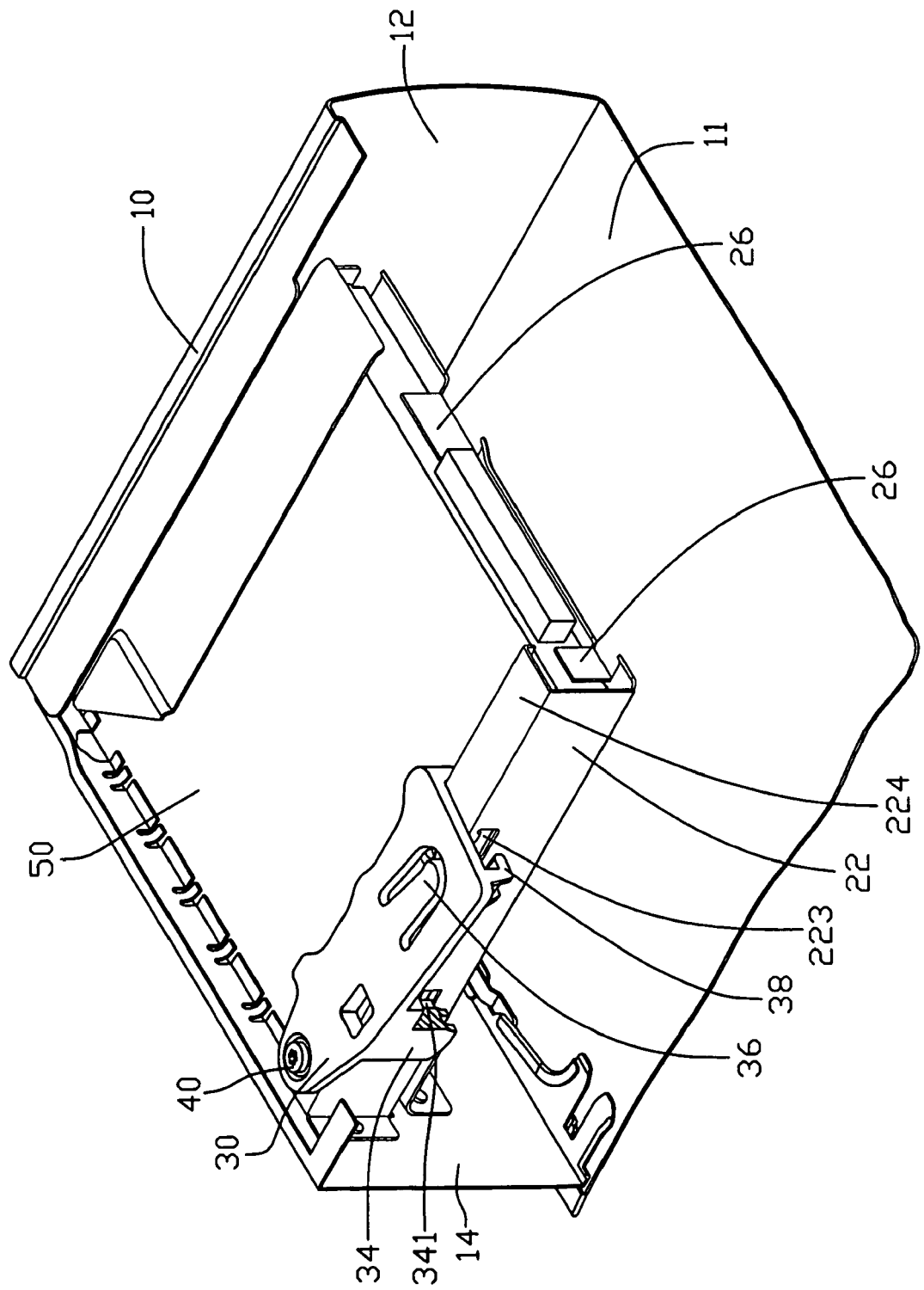
FIG. 3 is an pre-assembled isometric view of FIG. 1, but without the data storage device.
Figure 4:
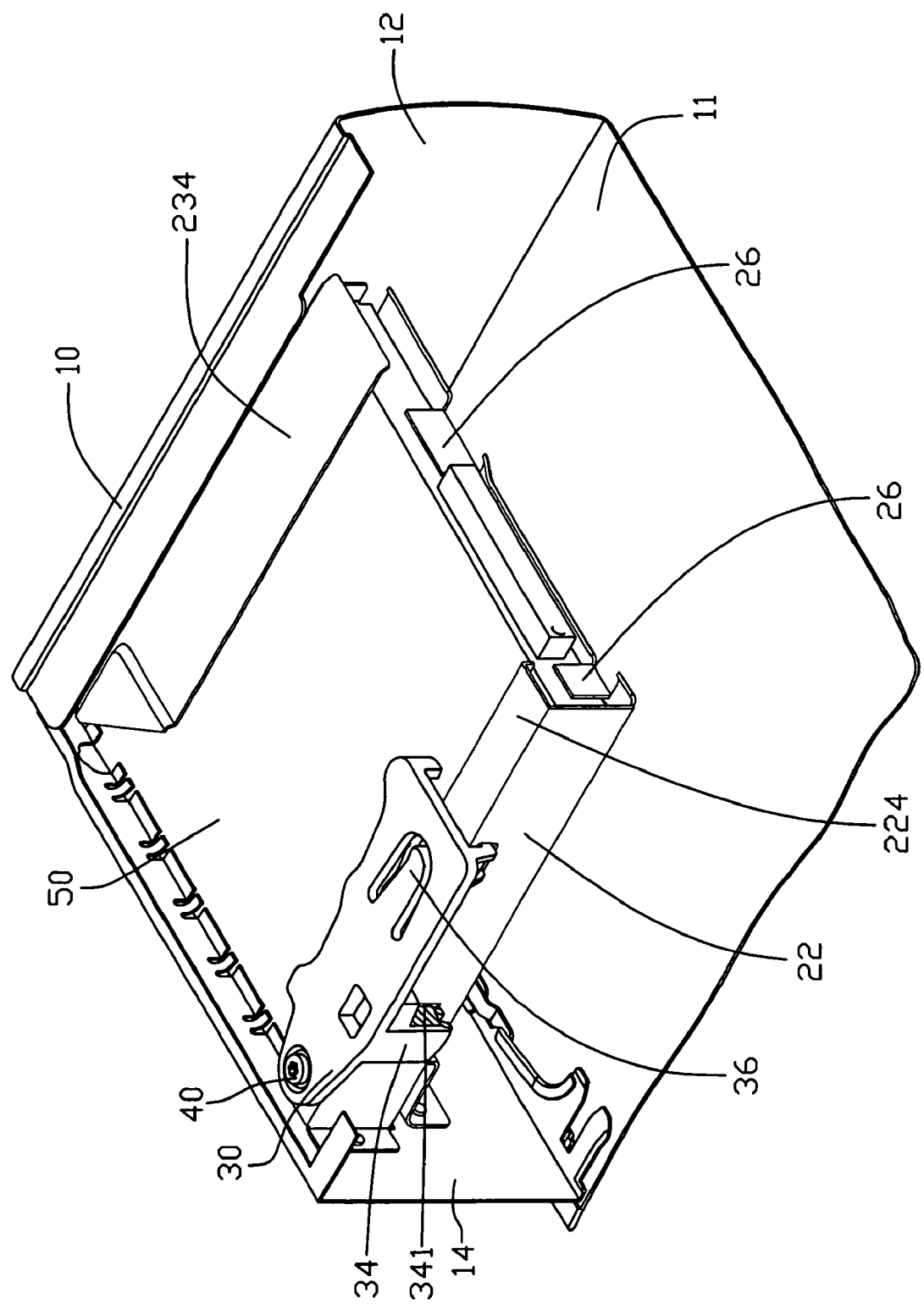
FIG. 4 is an assembled isometric view of FIG. 1.

Referring also to FIGS. 3 and 4, before the data storage device 50 is mounted to the chassis 10, the fastener 40 extends through the through hole 31 of the positioning member 30 and the screw hole 226 of the supporting bracket 20 to pivotably secure the positioning member 30 on the supporting bracket 20. The positioning member 30 can pivot around the fastener 40. Then, the supporting bracket 20 is securely mounted to the front panel 14 of the chassis 10 corresponding to the opening 16. The sidewall 23 of the supporting bracket 20 is adjacent to the side panel 12 of the chassis 10.

In assembly of the data storage device 50, at first, the data storage device 50 is inserted in the supporting bracket from the opening 16 of the chassis 10 until the rearwall 52 of the data storage device 50 is stopped by the stopping tab 26 of the supporting bracket 20. At the moment, the groove 522 of the data storage device 50 is in alignment with the through hole 221 of the supporting bracket 20. Then, the positioning member 30 is pivoted towards the data storage device 50 to have the locating pin 341 extending through the through hole 221 and inserting in the groove 522 of the data storage device 50. Simultaneously, the protrusion 361 of the positioning member 30 engages in the recess 228 of the supporting bracket 20 for locating the positioning member 30. The resisting block 38 also extends through the through slot 223 and abuts against the data storage device 50 to prevent the data storage device 50 from moving therein. Thereby, the data storage device 50 is securely attached to the chassis 10.

In disassembly of the data storage device 50, the handle 32 of the positioning member 30 is pushed outward to cause the positioning member 30 to pivot outward around the fastener 40. Therefore, the protrusion 361 of the positioning member 30 disengages from the recess 228 of the supporting bracket 20. The resisting block 38 is also retreated from the through slot 223. Simultaneously, the locating pin 341 is also retreated from the groove 522 of the data storage device 50 and the through hole 221 of the supporting bracket 20. Consequently, the locating pin 341 disengages from the groove 522 of the data storage device 50. In this manner, the data storage device 50 is easily taken out from the chassis 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. A mounting apparatus for a data storage device comprising:
   a chassis;
   a supporting bracket attached to the chassis, the supporting bracket having a sidewall defining a first through hole therein; and
   a positioning member, a second through hole defined at a distal end thereof, the positioning member mounted on the supporting bracket via a fastener inserting into the second through hole, the positioning member pivoted about the fastener and capable of mounting the data storage device to the supporting bracket, the positioning member having a locating pin capable of extending through the first through hole for securing the data storage device in the supporting bracket.

2. The mounting apparatus for a data storage device as recited in claim 1, wherein the sidewall of the supporting bracket is bent inwardly to form a flange for the positioning member mounted thereon.

3. The mounting apparatus for a data storage device as recited in claim 2, wherein a recess is defined in the flange, and a protrusion is formed on the positioning member for engaging in the recess.

4. The mounting apparatus for a data storage device as recited in claim 3, wherein the positioning member has an elastic tab with the protrusion formed thereon for engaging in the recess.

5. The mounting apparatus for a data storage device as recited in claim 1, wherein the positioning member has a supporting portion, and the locating pin extends inwardly from the supporting portion.

6. The mounting apparatus for a data storage device as recited in claim 1, wherein a through slot is defined in the sidewall of the supporting bracket, and the positioning member further forms a resisting block for extending through the through slot, thereby securing the data storage device in the supporting bracket.

7. The mounting apparatus for a data storage device as recited in claim 1, wherein at least one stopping tab extends upwardly from a bottom wall of the supporting bracket for locating the data storage device.

8. The mounting apparatus for a data storage device as recited in claim 1, wherein the chassis has a front panel, and an opening is defined in the front panel thereof for an entrance of the data storage device.

9. A data storage device assembly comprising:
   a chassis;
   a data storage device with a groove defined in a sidewall thereof;
   a supporting bracket mounted to the chassis, the supporting bracket having a sidewall defining a through hole and a recess therein; and
   a positioning member adapted to be movably attachable to the supporting bracket, the positioning member having a protrusion capable of engaging in the recess for locating the positioning member and a locating pin capable of extending through the through hole to engage in the groove for securing the data storage device in the supporting bracket.

10. The data storage device assembly as recited in claim 9, wherein the mounting apparatus further comprises a fastener for pivotably mounting the positioning member on the supporting bracket.

11. The data storage device assembly as recited in claim 9, wherein the sidewall of the supporting bracket is bent vertically and inwardly to form a flange for the positioning member mounted thereon.

12. The data storage device assembly as recited in claim 9, wherein the positioning member has an elastic tab with the protrusion formed thereon for engaging in the recess.

13. The data storage device assembly as recited in claim 9, wherein the positioning member has a supporting portion, and the locating pin extends inwardly from the supporting portion.

14. The data storage device assembly as recited in claim 9, wherein a through slot is defined in the sidewall of the supporting bracket, and the positioning member further forms a resisting block for extending through the through slot, thereby securing the data storage device on the supporting bracket.

15. The data storage device assembly as recited in claim 9, wherein at least one stopping tab extends upwardly from a bottom wall of the supporting bracket for locating the data storage device.

16. The data storage device assembly as recited in claim 9, wherein the chassis has a front panel, and an opening is defined in the front panel thereof for an entrance of the data storage device.

17. A mounting apparatus for a data storage device comprising:
   a chassis;
   a supporting bracket mounted to the chassis for receiving the data storage device, the supporting bracket having a bottom wall with a stopping tab extending therefrom and a sidewall with a through hole defined therein; and
   a positioning member adapted to be pivotably mounted to the supporting bracket, the positioning member having a locating pin, whereby the locating pin is capable of extending through the through hole for securing the data storage device in the supporting bracket when the data storage device is stopped by the stopping tab.

18. The mounting apparatus for a data storage device as recited in claim 17, wherein the sidewall of the supporting bracket is bent to form a flange with a recess defined therein, and the positioning member has a protrusion for engaging in the recess, thereby securing the positioning member on the supporting bracket.

19. The mounting apparatus for a data storage device as recited in claim 17, wherein a through slot is defined in the sidewall of the supporting bracket, and the positioning member further forms a resisting block for extending through the through slot to secure the data storage device in the supporting bracket.

* * * * *